United States Patent

[11] 3,602,401

[72] Inventor Robert F. Lense
 Rockford, Ill.
[21] Appl. No. 858,933
[22] Filed Sept. 18, 1969
[45] Patented Aug. 31, 1971
[73] Assignee Riegel Paper Corporation
 New York, N.Y.

[54] VOLUMETRIC MEASURING AND DISPENSING DEVICE WITH SCRAPER
8 Claims, 12 Drawing Figs.

[52] U.S. Cl. .................................................. 222/190,
 222/345, 141/314, 141/129
[51] Int. Cl. ........................................................ B67d 5/58
[50] Field of Search ............................................ 222/80, 81,
 82, 161, 194, 190, 361, 362, 342, 344, 345, 354,
 438, 439, 305–308; 141/167, 185, 237; 53/122;
 83/191, 198; 221/204, 205

[56] References Cited
UNITED STATES PATENTS
| | | | |
|---|---|---|---|
| 1,052,654 | 2/1913 | Crowley | 222/194 |
| 2,857,939 | 2/1954 | Pechy | 222/342 X |
| 3,249,257 | 10/1964 | Nolt | 222/80 |
| 3,330,311 | 10/1964 | Christine et al. | 141/167 |

Primary Examiner—Samuel F. Coleman
Assistant Examiner—Larry Martin
Attorney—Wolfe, Hubbard, Leydig, Voit & Osann ABSTRACT: A machine for volumetrically measuring and dispensing predetermined quantities of a product such as peas, beans, corn or potatoes. A large quantity of the product is stored in a hopper, and to divide the product into charges of predetermined quantity, the product is discharged into a measuring receptacle of predetermined volume through a spout in the hopper. To dispense the product, the receptacle is moved by a fluid operated actuator from a filling position beneath the spout to a discharge position spaced horizontally from the spout, the receptacle being slidable on a slideway which is mounted for vertical adjustment on the machine frame. Accurate filling of the receptacle is insured by a blade which is attached to the actuator and which, prior to shifting of the receptacle from the filling position, is moved over a portion of the upper end of the receptacle, the blade then being movable with the receptacle to the discharge position to slice through the product between the spout and the receptacle and to level the top layer of product even with the top of the receptacle. The receptacle is formed by two sleeves which are slidably interfitted, and the volume of the receptacle can be changed by telescoping the sleeves together or extending the sleeves by raising or lowering the slideway. A vacuum drain is positioned in the slideway beneath the hopper spout to drain excess fluid from the product.

INVENTOR.
ROBERT F. LENSE,
BY Wolfe, Hubbard, Voit & Osann
ATTORNEYS.

3,602,401

VOLUMETRIC MEASURING AND DISPENSING DEVICE WITH SCRAPER

BACKGROUND OF THE INVENTION

This invention relates to a machine for volumetrically measuring and dispensing equal predetermined quantities of a product and, more specifically, a particlelike product such as peas, corn, beans, diced potatoes, and the like. The product is stored in a hopper mounted on the frame of the machine and is discharged through a spout into a receptacle of predetermined volume slidable on a slideway which is mounted on the frame. The receptacle is movable between a filling position beneath the spout and a discharge position spaced horizontally from the spout and preferably is formed by inner and outer telescoping sleeves so that the volume of the receptacle can be changed by varying the extent of telescoping the sleeves.

SUMMARY OF THE INVENTION

The primary object of the present invention is to level the top layer of product in the receptacle even with the top of the receptacle more accurately and smoothly than has been possible heretofore thereby to insure more accurate filling of the receptacle.

It is a more detailed object to accomplish the above by passing a blade through the particles between the receptacle and the spout after the receptacle is filled so as to cut through the particles and thus reduce the tendency of the particles to jump out of the receptacle as the top layer is leveled and as the receptacle is moved to the discharge position.

Another aspect of the invention resides in the novel mounting of the blade to enable fast operation of the machine while still reducing the tendency of the particles to jump, this being accomplished by moving the blade to cover only a portion of the upper end of the receptacle while the latter is in the filling position and then moving the blade and the receptacle in unison to the discharge position with the blade covering only a portion of the upper end of the receptacle.

It is a further object of the invention to remove excess liquid from the product in the receptacle and, for this purpose, a drain with a vacuum pulled thereon communicates with the receptacle when the latter is in the filling position.

It is still another object of the present invention to provide a unique arrangement for changing the volume of the receptacle without the necessity of raising or lowering the hopper or dismantling the machine and, more specifically, this is accomplished by mounting the slideway adjustably on the frame for vertical movement to be raised or lowered thus telescoping or extending the sleeves to change the volume of the receptacle.

It is a related object to insure extension of the sleeves in direct proportion to the lowering of the slideway by the provision of means to bias one of the sleeves against the slideway with a pressure that remains constant regardless of the degree of extension of the sleeves.

Other objects and advantages of the invention will become apparent from the following detailed description taken in connection with the accompanying drawings.

BRIEF DESCRIPTION OF THE DRAWINGS

FIG. 6 is an enlarged fragmentary cross section taken substantially along the line 6—6 of FIG. 3.

FIG. 7 is an enlarged fragmentary cross section taken substantially along the line 7—7 of FIG. 3.

FIG. 8 is a fragmentary elevational view of the receptacle illustrated in FIG. 4 but showing the sleeves extended.

DESCRIPTION OF THE PREFERRED EMBODIMENT

Figure 4:
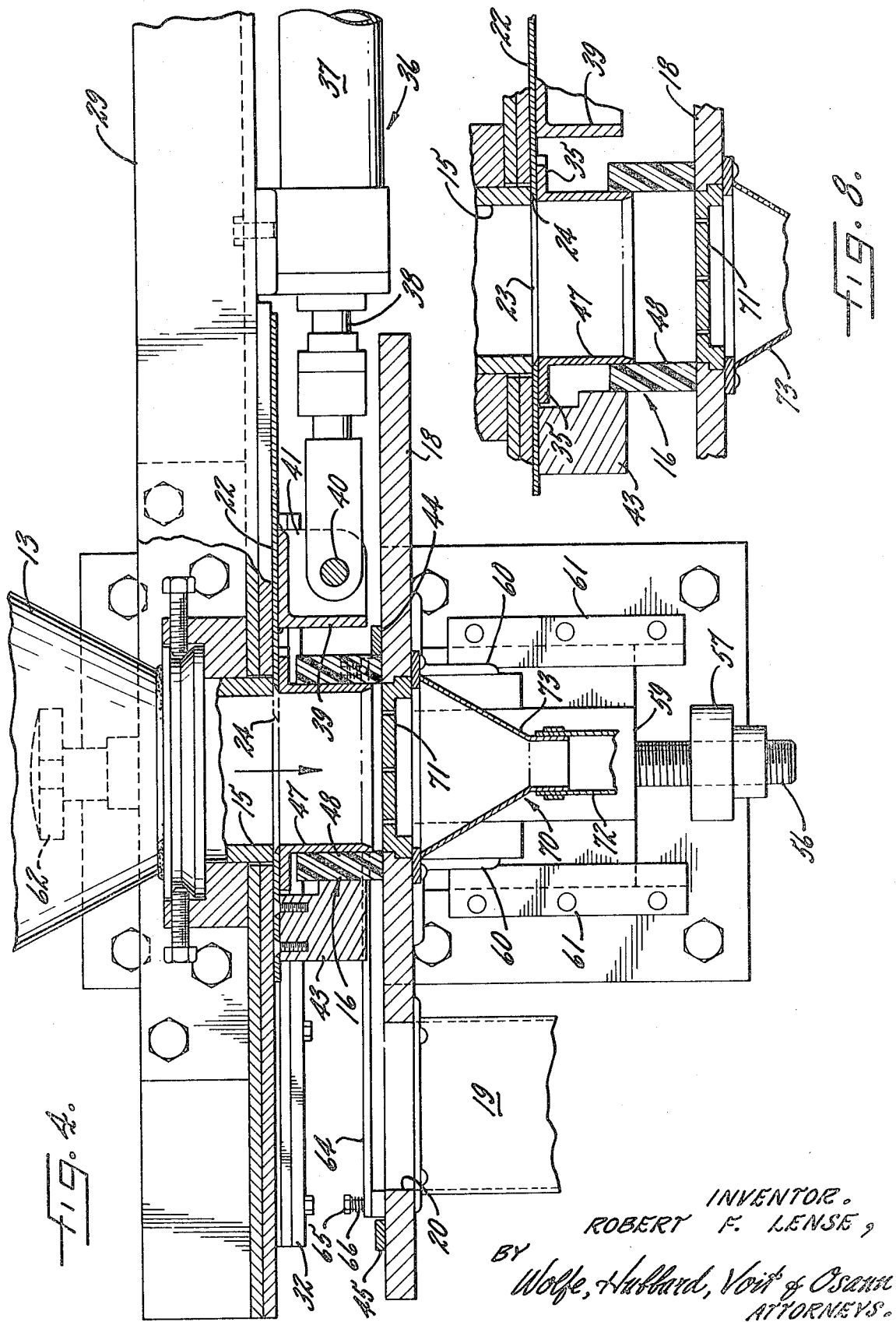
FIG. 4 is an enlarged, fragmentary cross section taken substantially along the line 4—4 of FIG. 3.
Figure 5:
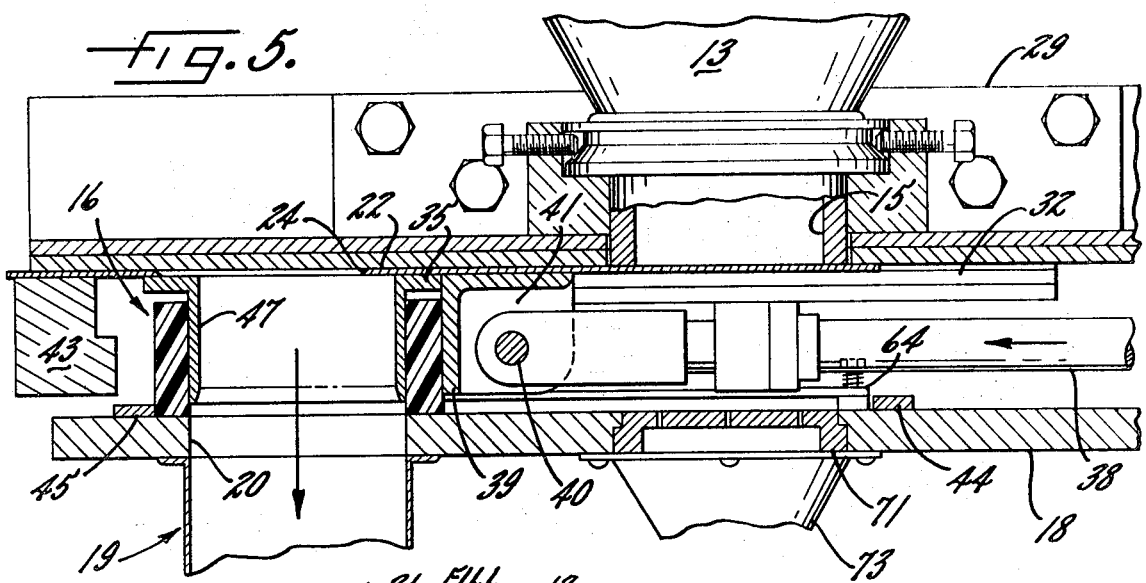
FIG. 5 is a fragmentary view similar to FIG. 4 but showing certain parts in moved positions.

As shown in the drawings for purpose of illustration, the invention is embodied in a machine 10 (FIG. 1) for dividing a product into measured charges of equal predetermined volume and dispensing these charges into containers 11. A large amount of the product 12 (FIG. 9) is stored in a hopper 13 mounted on the frame 14 of the machine and is discharged from the hopper through a spout 15 (FIG. 4) and into the open upper end of a receptacle 16 or transchamber 16 (FIG. 2) of predetermined volume, the receptacle initially being positioned beneath the spout in a filling position. When the receptacle is full, the top layer of the product in the receptacle is leveled, and the receptacle is slid along a flat, generally horizontal slideway 18 (FIG. 4) to a discharge station or position (FIG. 1) over a discharge funnel 19 (FIGS. 1 and 5) which extends downwardly from a hole 20 (FIG. 5) in the slideway. The bottom of the receptacle is open with the slideway preventing the escape of product from the open bottom except when the receptacle is in the discharge position. To empty the receptacle, the latter is moved over the discharge funnel, and the product falls through the open bottom of the receptacle and through the hole 20 into the discharge funnel and is dispensed into one of the containers 11 positioned beneath the discharge funnel.

In this instance, the product 12 is formed of irregularly shaped particles 21 (FIG. 9) such as peas, beans, kernels of corn, or diced potatoes. These particles from a rough, uneven upper layer at the top of the receptacle 16 and, when the upper layer is leveled even with the top of the receptacle to form one charge of predetermined volume, the particles tend to jump upwardly to leave the receptacle partially unfilled.

In accordance with the present invention, the tendency of the particles 21 to jump out of the receptacle 16 is restricted by shearing the top layer of particles even with the top of the receptacle and by confining the lower portions of the cut particles within the receptacle. For these purposes, a blade 22 (FIG. 5) is advanced between the spout 15 and the top of the receptacle to cover a portion of the top of the receptacle prior to movement of the receptacle from the filling position. The blade then is advanced with the receptacle to the discharge position to cut through the particles forming the top layer and confine the lower portions of these particles beneath the blade thus preventing the particles in the top layer from jumping out of the receptacle during leveling. With this arrangement, the receptacle can be filled more accurately and consistently with an exact volume of product than had been possible heretofore and, by moving the blade partially over the receptacle and then moving the two in unison, the machine 10 can be operated at a high rate of speed.

In this instance, the blade 22 is moved in a two-stage operation to cut through the particles 21 forming the top layer of the product 12 in the receptacle 16 to level the top layer of particles in the receptacle even with the top of the receptacle. First, the blade is advanced from right to left (from the position shown in FIG. 9) and between the upper end of the receptacle and the lower end of the spout 15 to a cutting position (FIG. 10) in which the blade covers a portion of the upper end of the receptacle. As the blade is advanced to the cutting position, the blade cuts through the particles in its path. Finally, once the blade reaches the cutting position, the blade and the receptacle are moved in unison from right to left to the discharge position (FIG. 11) with the blade moving across the lower end of the spout and slicing off the particles level with the upper end of the receptacle. As the receptacle slides from beneath the spout, the upper end portions of the particles in the upper layer which extend both above and below the top of the receptacle are held against movement by the lower edge portion of the spout, and the blade slices through these particles thus allowing the upper portions of the particles to remain in the spout while the lower portions are forced under the blade to be held in the receptacle against upward movement by the blade.

Figure 3:
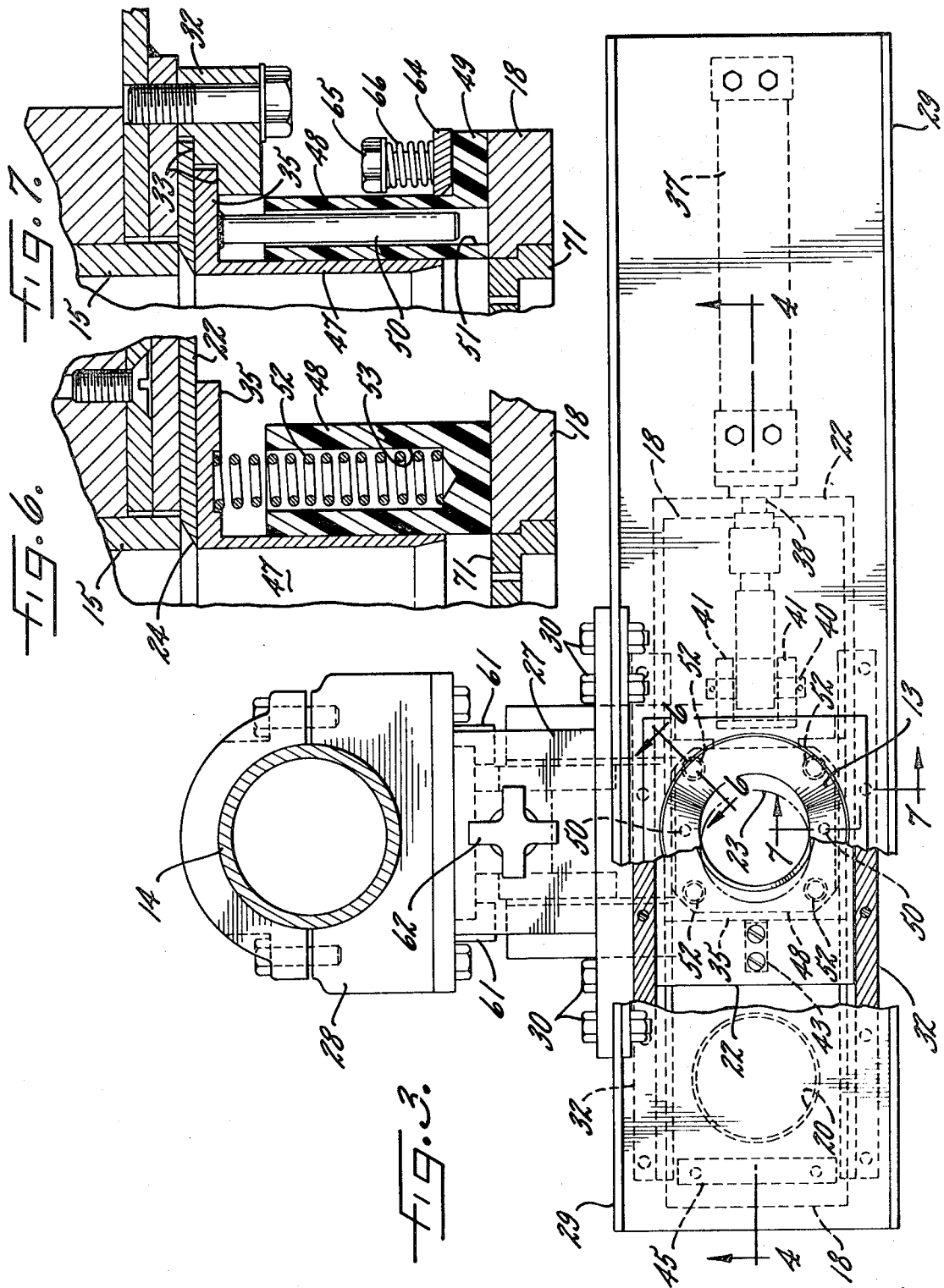
FIG. 3 is an enlarged cross section taken substantially along the line 3—3 of FIG. 1 and with parts broken away for purposes of clarity.

As best shown in FIG. 3, the blade 22 herein is in the form of a rectangular plate which is located above the receptacle 16 in a generally horizontal plane. The blade extends across the entire upper end of the receptacle and extends beyond the edges of the receptacle both to the right and left (FIG. 3). To allow the product 12 to pass through the blade into the receptacle and also to from the cutting edge of the blade, a circular hole 23 of the same diameter as the interior of the upper end of the receptacle is formed vertically through the blade. The edge 24 (FIG. 6) forming the hole is bevelled to form the cutting edge. When the product is being discharged from the spout 15 into the receptacle, the hole 23 is centered over the top of the receptacle thus allowing the product a clear path from the spout to the receptacle. Prior to movement of the receptacle toward the discharge position, the blade is shifted to the left to the cutting position (FIG. 10) in which the center of the hole 23 is disposed slightly to the left (FIG. 10) of the vertical centerline of the receptacle and in which a portion of the blade covers a portion of the upper end of the receptacle to expose the cutting edge (phantom lines in FIG. 3). The blade is of sufficient length so that, as the blade and receptacle move from the filling position to the discharge position, the blade extends across the lower end of the spout thus closing the latter.

Figure 2:
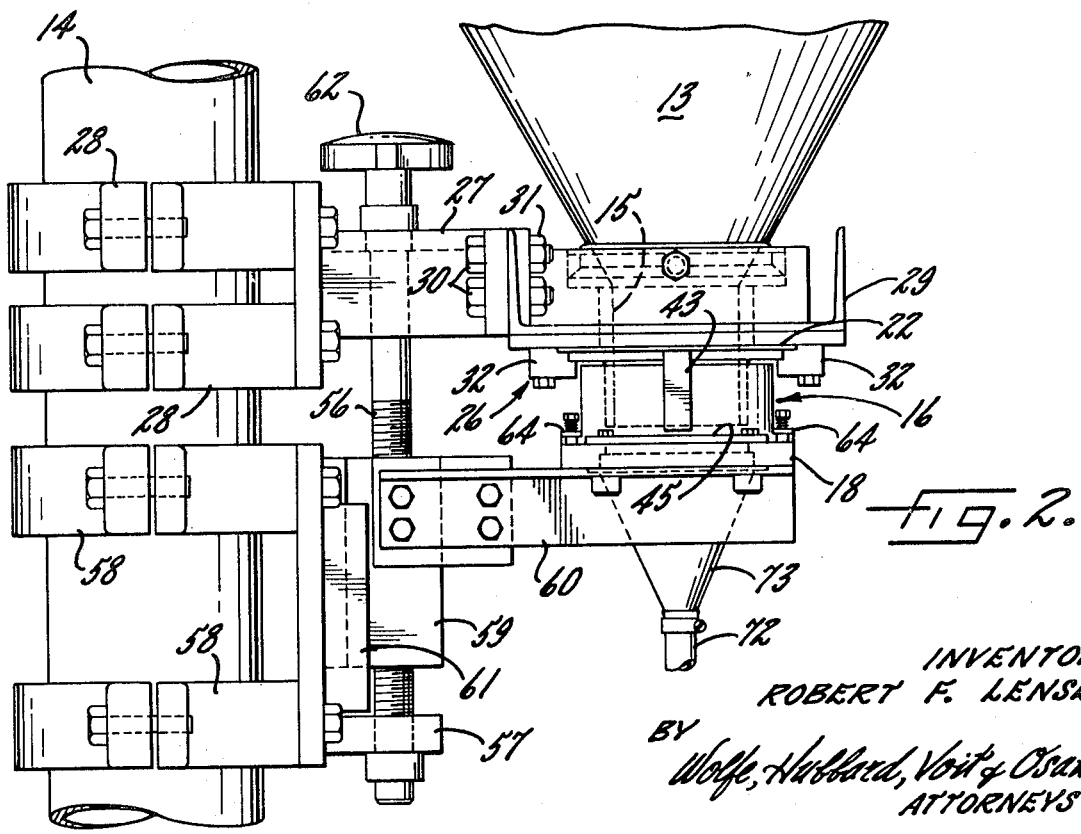
FIG. 2 is an enlarged fragmentary elevational view of a portion of the machine shown in FIG. 1.

To support and guide the blade 22 for movement and to support and guide the upper end portion of the receptacle 16, a guideway 26 (FIG. 2) extends generally horizontally above the slideway 18. The guideway is supported above the slideway on one end of an arm 27 which extends horizontally between the frame 14 and one edge of the guideway. As shown in FIG. 2, the frame comprises a vertical support post on which the arm is mounted by a pair of collars 28. The guideway comprises a horizontally extending, channel-shaped member 29 with the flanges extending upwardly and with one flange bolted to the arm 27 by bolts 30 and nuts 31. Bolted on the underside of the channel-shaped member are two parallel, spaced apart guide rails 32 (FIG. 2) which extend longitudinally of the slideway. The inner face of each rail is formed with a pair of steps 33 (FIG. 7) the upper step on each rail supporting the side edge portions of the blade 22 and mounting the latter for sliding movement. So that the receptacle can be guided during sliding between the filling position and the discharge position, the upper end portion of the receptacle is formed with laterally extending flanges 35 (FIG. 7) which ride on the lower steps of the guide rails.

In this instance, the blade 22 and the receptacle 16 are moved by a fluid operated actuator 36 (FIG. 4) which is suspended from the right end portion of the channel-shaped member 29 beyond the right ends of the guide rails 32. The actuator comprises a cylinder 37, a piston (not shown) movable back and forth in the cylinder in response to the admission of air alternately into the opposite ends of the cylinder, and a rod 38 connected to the piston for movement therewith. To enable the rod to push the receptacle and move the blade, a piece of angle 39, with one leg extending vertically and the other horizontally, is connected to the free end of the rod by a pin 40 which extends through the rod and through a pair of parallel plates 41 welded to the two flanges of the angle in positions perpendicular to the two flanges. The underside of the blade is welded to the upper side of the horizontal leg of the angle and is positioned such that, when the rod is fully retracted and the receptacle is in the filling position, the hole 23 in the blade is centered over the open upper end of the receptacle. When the hole is so centered and the rod retracted, the vertical leg of the angle is spaced a short distance from the outer surface of the wall of the receptacle (see FIG. 9). During initial extension of the rod, the blade is moved relative to the receptacle to the cutting position. After the rod has extended sufficiently to place the angle in contact with the receptacle, further extension of the rod moves the receptacle and the blade in unison toward the discharge position. This is in effect a lost motion type connection between the rod and the receptacle.

Figure 9:
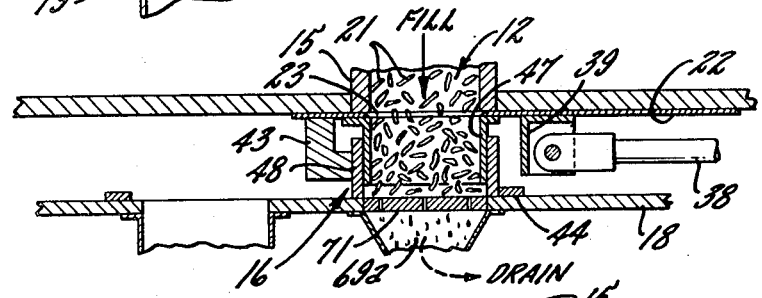
FIG. 9 is a fragmentary view showing the receptacle in the filling position and being filled.

The blade 22 and the receptacle 16 are arranged such that initial retraction of the rod 38, after extension thereof, will move the blade from left to right relative to the receptacle until the hole 23 is centered over the upper end of the receptacle, and then further retraction of the rod will move the blade and receptacle in unison from left to right toward the filling position. Successive steps in the movement of the blade and the receptacle are shown in FIGS. 9 to 12. As shown in FIG. 9, an L-shaped block 43 is rigidly mounted on and depends from the left end portion of the blade and engages the wall of the receptacle when the hole 23 is centered over the receptacle. Initial extension of the rod moves the blade from right to left relative to the receptacle thus moving the block away from the receptacle wall. During initial retraction of the rod, the blade moves from the cutting position until the hole is recentered over the receptacle, at which point the block engages the wall of the receptacle, and further retraction of the rod moves the blade and receptacle in unison toward the filling position. The use of the block effects a second lost motion connection between the rod and the receptacle. While the blade could be moved across the entire upper end of the receptacle prior to movement of the receptacle, the above arrangement is particularly advantageous because the fill and discharge cycle can be completed more rapidly due to shorter independent travel of the blade, and the life of the container is longer because the angle 39 hits the container after a slower, shorter travel. To prevent the receptacle from traveling beyond the discharge position when the rod is extended and to prevent travel beyond the filling position when the rod is extended and to prevent travel beyond the filling position when the rod is retracted, two end stops 44 and 45 (FIGS. 9 and 11) extend laterally across the slideway 18 and are rigidly mounted thereon.

Figure 11:
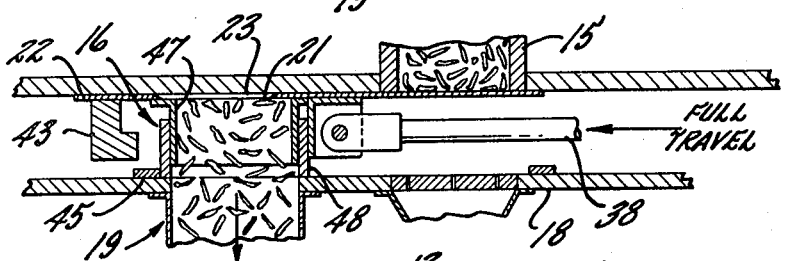
FIG. 11 is a view similar to FIG. 9 but showing the receptacle in the discharge position with the blade covering a portion of the upper end of the receptacle.
Figure 12:
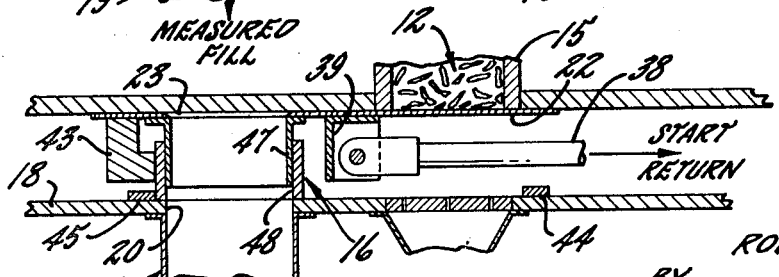
FIG. 12 is a view similar to FIG. 9 but showing the receptacle just prior to being returned to the filling position.

For a summary of the filling and discharge cycle of the receptacle 16, assume that the cycle begins with the receptacle in the discharge position, as shown in FIG. 11, with the blade 22 covering a portion of the upper end of the receptacle and the block 43 spaced from the receptacle. After the charge of product 12 falls out of the receptacle into the funnel 19 to be placed in one of the containers 11, the rod 38 is retracted and, during initial retraction of the rod, the blade moves relative to the receptacle to center the hole 23 in the blade over the open upper end of the receptacle. This initial retraction of the rod moves the vertical leg of the angle 39 away from the receptacle. As shown in FIG. 12, the block 43 engages the receptacle when the hole 23 is centered over the open upper end. Further retraction of the rod moves the blade and receptacle in unison toward the filling position, the block forcing the receptacle to move with the blade. Complete retraction of the rod places the receptacle in the filling position under the spout 15 with the block still engaging the receptacle and the hole 23 in the blade centered over the upper end of the receptacle so that the product can fall from the spout into the receptacle (see FIG. 9). The receptacle dwells in the filling position and is filled with product.

Figure 10:
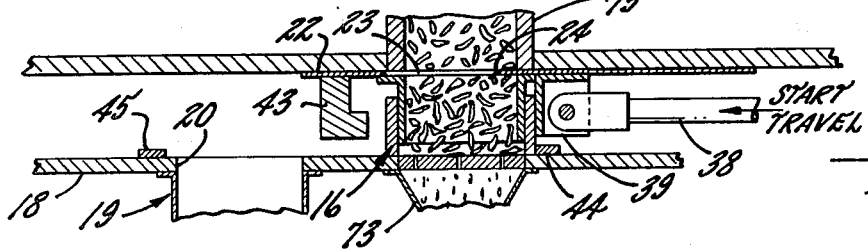
FIG. 10 is a view similar to FIG. 9 but showing the blade covering a portion of the upper end of the receptacle.

Once the receptacle 16 is full, it is moved by advancement of the rod 38 of the actuator 36 to the discharge position to fill one of the containers 11. The operation of the actuator is timed in relation to the advance of the containers one at a time to positions beneath the funnel 19 to be filled with a charge of the product 12 so that one charge is delivered as each container is moved into position beneath the funnel. During initial advancement of the rod, the blade, which is rigidly connected to the rod, moves relative to the receptacle until the vertical leg of the angle 39 contacts the receptacle (FIG. 10). This movement of the blade positions the blade in the cutting position in which a portion of the blade cover a portion of the upper end of the receptacle, and the cutting edge of the blade slices through the particles 21 in its path as the cutting edge moves partially across the upper end of the receptacle. Further advancement of the rod moves the receptacle and blade in unison to the discharge position. As the receptacle and blade move, the cutting edge of the blade passes beneath the spout thus cutting through any particles which extend partially above the top of the receptacle. By cutting through the top layer of particles in this manner, the lower portions of the cut particles are forced under the blade and the upper portions are allowed to remain in the spout thus reducing the tendency of the particles in the top layer to jump out of the receptacle and thus resulting in accurate filling of the receptacle. The receptacle is moved to the discharge position by full advancement of the rod to discharge the charge of product into the funnel thus completing one full cycle. As shown in FIG. 11, the blade closes the bottom of the spout when the receptacle is not beneath the spout so as to prevent loss of the product.

To allow the machine 10 to be used to divide the product into any given predetermined quantity within a given range without replacing the receptacle 16, the receptacle can be changed to accommodate any volume within a predetermined range of volumes. This is accomplished by forming the receptacle with an inner telescoping sleeve 47 (FIG. 8) and an outer telescoping sleeve 48. When the volume of the receptacle is to be decreased, the sleeves are telescoped together and, when the volume is to be increased, the sleeves are extended or pulled away from one another. The inner sleeve is cylindrical with the flange 35 which rides on the guide rail 32 being formed on the upper end portion of the inner sleeve and extending outwardly therefrom.

In this instance, the outer sleeve 48 is formed a cylindrical bore and a square exterior shape with chamfered vertical corners, and flanges 49 (one shown in FIG. 7) which ride on the slideway 18 extend laterally outwardly from opposite sides of the lower end portion of the outer sleeve. Guiding the sleeves as the latter telescope or extend are two pins 50 (FIGS. 3 and 7) which are rigidly mounted on and depend from the underside of the flange 35 on the inner sleeve, and these pins slide in vertical bores 51 formed in the outer sleeve. The inner sleeve is held in the guide rails 32 between the blade 22 and the steps 33 of the guide rails. To help keep the outer sleeve pressed against the slideway, four compression springs 52 (FIGS. 3 and 6) are seated in vertical bores 53 in the corners of the outer sleeve, and these springs are compressed between the bottoms of the bores and the undersides of the flanges 35 to urge the sleeves apart.

Advantageously, the slideway 18 is adjustably mounted on the post 14 for vertical movement to allow the volume of the receptacle 16 to be changed by raising and lowering of the slideway with the sleeves 47 and 48 telescoping or extending. With this arrangement, the volume of the receptacle can be changed simply and easily without moving the comparatively heavy hopper 13 and without any dismantling of the machine being required. To support the slideway for vertical movement, a traveling nut arrangement is used. Herein, a rod 56 (FIG. 2) extends vertically through the arm 27 which mounts the guideway 26 on the post, and the lower end portion of the rod extends through a guide 57 connected to a pair of brackets 58 which are mounted on the post below the pair of brackets 28 supporting the arm. The rod is free to turn in the arm and the guide and is threaded from a point above the guide to a point below the arm. An elongated T-shaped nut 59 (FIGS. 2 and 4) is threaded onto the rod between the arm and the guide, and a pair of angles 60 extend between the nut and the underside of the slideway, the angles being rigidly connected on opposite end portions to the nut and the slideway. To prevent the T-shaped nut form turning when the rod is turned, the flanges of the nut ride in a pair of vertical Z-shaped guides 61 rigidly mounted on the brackets 58. The slideway is raised or lowered by turning the rod with a knob 62 (FIG. 2) on the upper end of the rod thus forcing the nut to ride up or down the rod.

When the sleeves 47 and 48 are extended to increase the volume of the receptacle 16 to volumes near the upper limit of the predetermined range of volumes, the springs 52 reach their expansion limits and are not fully effective to bias the outer sleeve 48 against the slideway 18. Advantageously, additional biasing means are provided to keep a constant downward pressure on the flanges 49 of the outer sleeve to insure that the outer sleeve will be pressed against the slideway when the sleeves are fully extended. Herein, the biasing means comprise a pair of elongated rectangular plates 64 (one shown in FIG. 4) which extend longitudinally of the slideway from the end stop 44 to the end stop 45 and which overlie the flanges 49 of the outer sleeve. Screws 65 (FIG. 7) extend through the end portions of the plates to mount the latter on the slideway and, to bias the plates against the top of the flanges, a compression spring 66 is telescoped onto each screw and is compressed between the head of the screw and the top of the respective plate. With this arrangement, the flanges of the outer sleeve are free to slide along the slideway while being biased against the slideway by the springs 66 through the plates 64 and, with the plates mounted directly on the slideway by the screws 65, the pressure exerted on the flanges is constant regardless of the extent the sleeves are extended.

Figure 1:
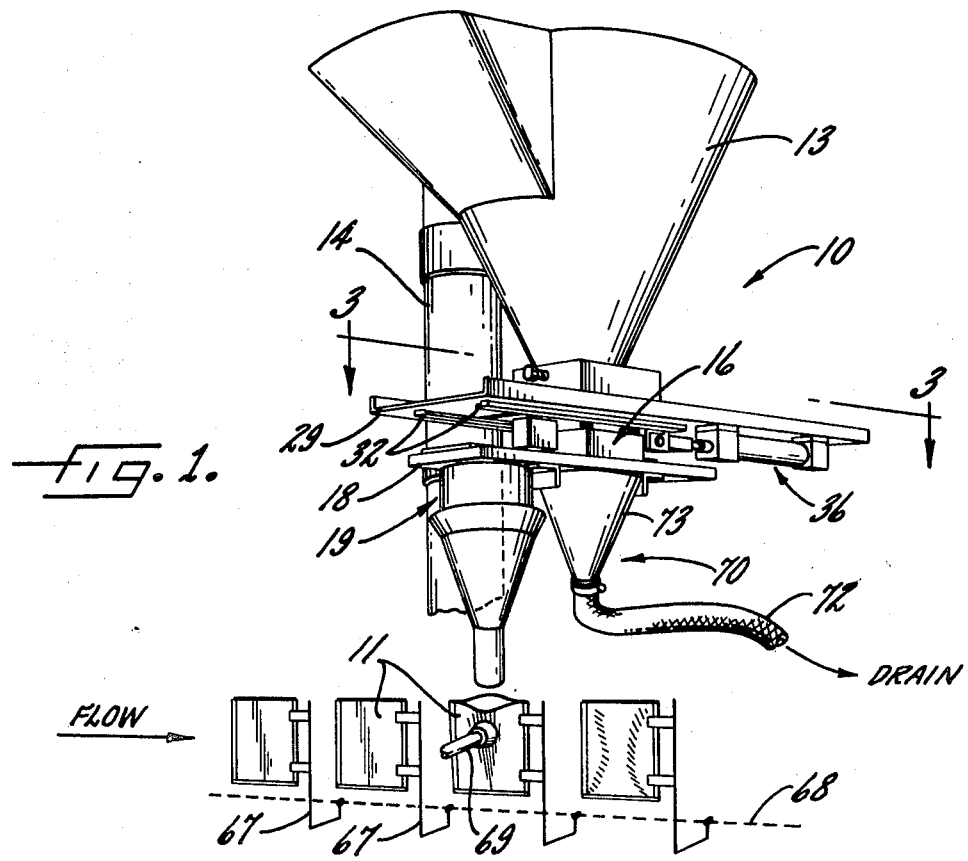
FIG. 1 is a fragmentary perspective view schematically showing a machine embodying the novel features of the present invention.

As shown in FIG. 1, the containers 11 receiving the product 12 are, in this instance, flat pouches formed of flexible material. The pouches are adapted to be gripped by clamps 67 connected to a power drive chain 68 and are advanced one at a time between a pair of suction cups 69 which grip the walls of the pouches and open the latter After being opened, each pouch is advanced beneath the discharge spout 19 to be filled with a charge of the product. During the time the product is in the hopper 13, a large quantity of excess liquid 69a (FIG. 9), mostly water, builds up in the hopper and must be removed prior to insertion of the product into the pouches. Advantageously, a drain 70 (FIG. 4) is positioned in the slideway 18 beneath the hopper spout 15 to draw off the excess liquid through the open lower end of the receptacle 16 during filling of the receptacle. The drain comprises a plate 71 formed with a series of vertical holes extending therethrough, the plate being mounted in a hole in the slideway directly beneath the spout. To increase the effectiveness of the drain, a tube 72 (FIG. 1) is connected at one end to the spout of a funnel 73 mounted on the underside of the slideway beneath the plate 71, and the other end of the tube is connected to a vacuum source (not shown), the excess fluid being sucked through the plate and the tube for disposal at the other end of the tube.

In view of the foregoing, it will be appreciated that the passing of the blade 22 to the cutting position between the upper end of receptacle 16 and the lower end of the hopper spout 15 and then the movement of the blade and receptacle in unison is a particularly advantageous arrangement. With this arrangement, the top layer of particles 21 of the product 12 in the receptacle can be leveled even with the top of the receptacle while reducing the tendency of the particles to jump during leveling thus allowing the product to be divided with accuracy into charges of equal volume. Moreover, mounting the blade to move to cover only a portion of the upper end of the receptacle before travel of the blade and receptacle in unison permits rapid cycling of the receptacle between the filling position and the discharge position ans also results in less wear and tear on the receptacle. The mounting of the slideway 18 for vertical adjustment is very beneficial because the volume of the receptacle can be changed more quickly and easily than has been possible previously. Holding of the outer sleeve 48 against the slideway with an even pressure regardless of the degree of extension of the sleeves 47 and 48 results from the advantageous arrangement of the plates 64 which are spring biased against the flanges 49 of the outer sleeve. Additionally, the excess liquid is removed from the product by the drain 70 prior to placement of the product in the pouches 11.

I claim as my invention:

1. In a machine for volumetrically measuring and dispensing predetermined quantities of a product, the combination of, a frame, a hopper mounted on said frame for storing a large supply of the product and having a spout for discharging the product, a measuring receptacle open at the upper end and slidable mounted on said frame, mechanism for sliding said receptacle in a predetermined direction form a filling position beneath said spout to a discharge position spaced horizontally form said spout, a blade connected to said mechanism for movement by the latter in said predetermined direction between the lower end of said spout and the upper end of said receptacle to a cutting position in which said blade covers a portion of the upper end of said receptacle prior to movement of said receptacle from said filling position, said blade being an elongated plate-shaped member positioned above said receptacle and having a hole extending vertically therethrough which is at least as large as the open upper end of said receptacle, said blade being movable with said receptacle from said filling position to said discharge position while still covering said portion of said receptacle, and said blade being operable to cut through the product between said spout and said receptacle as the latter is shifted to said discharge position thereby to insure that said receptacle will be accurately filled to a level even with the upper end of said receptacle.

2. The machine of claim 1 in which the lower end of said receptacle is open, said frame including a generally horizontal slideway with said receptacle being slidably mounted thereon, a drain in said slideway and vertically aligned with said spout, and means for pulling a vacuum on said drain so that excess liquid surrounding the product can be removed from the product in the receptacle prior to shifting of said receptacle to said discharge position.

3. The machine of claim 1 in which said frame includes a generally vertical support, a generally horizontal slideway adjustably mounted on said support for vertical movement, and said receptacle comprising inner and outer telescoping sleeves with one of said sleeves bearing against said slideway whereby the volume of said receptacle may be varied within a predetermined range by raising and lowering said slideway to telescope and extend said sleeves.

4. The machine of claim 3 in which the lower end portion of one said sleeves is formed with an outwardly extending flange which rides on said slideway, a generally horizontal elongated member positioned above said flange and extending between said filling position and said discharge position, means connected to said slideway for biasing said member downwardly into contact with said flange to hold said one sleeve against said slideway so that, when said slideway is lowered to change the volume of said receptacle, said one sleeve is biased against said slideway with a constant force thus causing said sleeves to extend to accurately reflect in the volume of the receptacle the movement of said slideway.

5. The machine of claim 1 in which said blade is of a length sufficient to cover and close the end of said spout while still covering said portion of said receptacle when said receptacle is in said discharge position.

6. The machine of claim 1 in which said mechanism comprises a fluid operated actuator, said actuator comprising a cylinder, a piston slidable back and forth in said cylinder in response to the admission of pressure fluid alternately into opposite ends of said cylinder, a rod connected at one end to said piston for advancement toward and retraction away from said receptacle, the other end of said rod being spaced from said receptacle when said receptacle is in said filling position and when the rod is retracted and said blade being connected to said rod so that initial advancement of said rod toward said receptacles moves said rod into engagement with said receptacle and moves said blade into said cutting position and further advancement of said rod moves said receptacle and said blade in unison.

7. The machine of claim 6 in which said blade extends beyond said receptacle in said predetermined direction, means connected to said blade for contacting said receptacle on the opposite side of said receptacle from said rod, said means being spaced from said receptacle when said receptacle is in said discharge position and moving into contact with said receptacle during initial retraction of said rod away form said receptacle and as said blade is moved to uncover said receptacle and said means being operable thereafter to move said receptacle toward said filling position during further retraction of said rod.

8. In a machine for volumetrically measuring and dispensing predetermined quantities of a product, the combination of, a frame, a hopper mounted on said frame for storing a large supply of the product and having a spout for discharging the product, a slideway adjustably mounted on said frame for vertical movement, a measuring receptacle open at its upper and lower ends and formed by two telescoping sleeves, said receptacle being slidably mounted on said slideway so that the volume of said receptacle can be changed by raising or lowering said slideway, mechanism for sliding said receptacle in a predetermined direction from a filling position beneath said spout to a discharge position spaced horizontally from said spout, a drain formed in said slideway and positioned beneath said receptacle when said receptacle is in said filling position, means for pulling a vacuum on said drain so that excess liquid surrounding the product in the receptacle can be quickly and easily removed prior to shifting of said receptacle, a flat, horizontally extending blade with a hole at least as large as the open upper end of said receptacle extending vertically through said blade, said blade being positionable between the upper end of said receptacle and said spout in a normal position in which said hole registers with the open upper end of said receptacle, said blade being connected to said mechanism for movement in said predetermined direction by said mechanism from said normal position to a cutting position in which said blade covers a portion of the upper end of said receptacle prior to movement with said receptacle from said filling position with said blade being movable with said receptacle from said filling position to said discharge position while still covering said portion of said receptacle, and said blade being operable to cut through the product between said spout and said receptacle to insure that said receptacle will be filled with product which is accurately leveled across the top of said receptacle.